United States Patent [19]

Heyer et al.

[11] 4,215,486
[45] Aug. 5, 1980

[54] CIRCUIT FOR CONTROLLING A DRYER-PROGRAM SWITCHING DEVICE

[75] Inventors: Günter Heyer; Hans Böddeker, both of Amberg, Fed. Rep. of Germany

[73] Assignee: Bosch-Siemens Hausgeräte GmbH, Stuttgart, Fed. Rep. of Germany

[21] Appl. No.: 960,636

[22] Filed: Nov. 14, 1978

[30] Foreign Application Priority Data

Nov. 16, 1977 [DE] Fed. Rep. of Germany ....... 2751277

[51] Int. Cl.² ............................................. F26B 11/04
[52] U.S. Cl. ........................................ 34/45; 219/509; 340/604; 340/620; 34/53
[58] Field of Search .................... 34/44, 45, 46, 48, 53; 340/604, 620; 219/509, 203

[56] References Cited

U.S. PATENT DOCUMENTS

| | | | |
|---|---|---|---|
| 3,394,467 | 7/1968 | Janke | 34/48 |
| 3,702,030 | 11/1972 | Janke | 34/48 |
| 3,882,381 | 5/1975 | Gregory | 340/602 |

OTHER PUBLICATIONS

Photoamplifier, Electronic Engrg., Feb. 1972, p. 52.

*Primary Examiner*—Larry I. Schwartz
*Attorney, Agent, or Firm*—Herbert L. Lerner

[57] ABSTRACT

Circuit for controlling the program timer of a laundry dryer as a function of the moisture-dependent resistance of the laundry. A storage capacitor charged from a d-c voltage source together with laundry resistance resulting from wet laundry bridging two electrodes and resistance determine the duty cycle or frequency for an oscillator. The output of the oscillator is fed to a filter and from there as one input to a comparator. A reference value setter is fed to another input of the comparator. The output of the comparator is functionally connected to the program timer. This circuit arrangement makes possible measurement of low residual moisture values in the laundry and thereby permits the start of the post-drying phase without heating on reaching this low residual moisture value.

2 Claims, 1 Drawing Figure

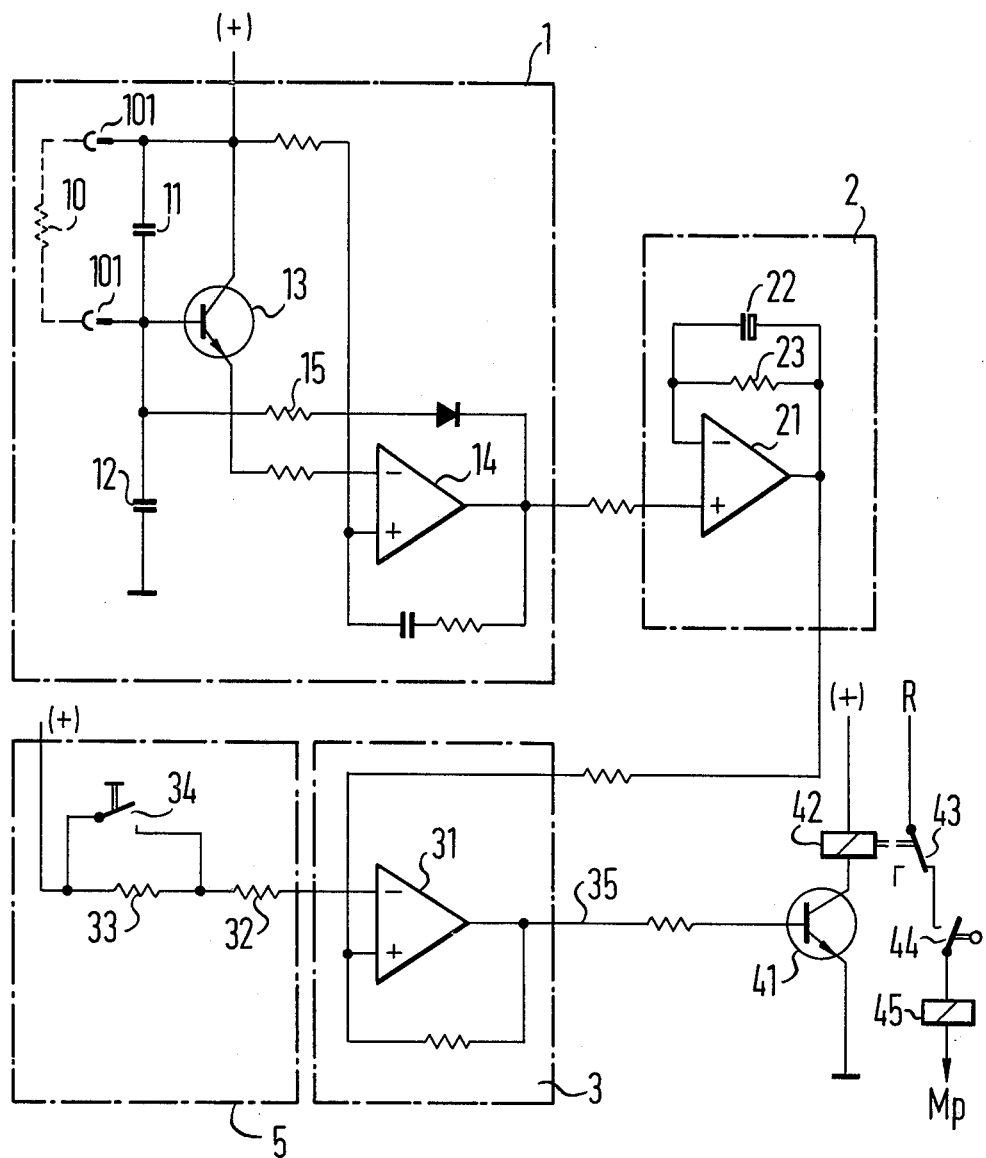

CIRCUIT FOR CONTROLLING A DRYER-PROGRAM SWITCHING DEVICE

BACKGROUND OF THE INVENTION

1. Field of the Invention

This invention relates to a circuit arrangement for controlling the program timer of a laundry dryer as a function of the moisture-dependent resistance of the laundry, via which a storage capacitor is charged from a d-c voltage source.

2. Description of the Prior Art

In German Published Prosecuted Application No. 17 63 659, a device for controlling drum dryers as a function of the degree of dryness of the laundry is described. The degree of dryness of the laundry is sensed by means of electrodes arranged in the laundry drum. The electrodes are temporarily bridged by the laundry. The resistance between the electrodes have a different value depending on the degree of dryness of the laundry. In this device, the voltage at the storage capacitor, which varies according to the resistance of the laundry, is fed to an integrator consisting of a resistor and a capacitor.

Since the resistance of the laundry becomes high for residual moisture values lower than about 25 to 30%, the charging time constant exceeds the discharging time constant, so that no sufficiently accurate measurement can be obtained in this moisture range without the use of additional means.

The device for the moisture-dependent control for a laundry dryer, described in German Published Prosecuted Application No. 19 35 511, attempts to eliminate this disadvantage. The charging of the capacitor is controlled here by an adjustable pulse generator. During the pulse intervals, the capacitor can discharge through the resistance of the laundry, depending on the duty cycle set and the residual moisture content. The averaged charging voltage is used as the switching criterion for a threshold switch. At residual moisture values lower than about 20%, however, the problem of electrostatic charging of the moving pieces of laundry which transfer their charge to the capacitor from time to time arises with greater frequency. Under these conditions, the charging voltage changes abruptly, which changed voltage can at times simulate a condition that the desired residual moisture has been reached, and thus trigger the threshold switch at the wrong time. An accurate and reliable determination of the desired residual moisture can therefore not be achieved with this method either.

The present invention starts out with a method of drying, in which the thermal energy supplied into the dryer system during the heating phase is used for post-drying after the heater is switched off. During this post-drying phase, a part of the moisture still escapes, thereby saving a substantial amount of energy. In general, the post-drying phase is initiated during the heating phase, when a residual moisture value obtained with the above-described measuring method is reached. Since it is impossible to accurately follow the residual moisture values below about 25% by known methods, the heating phase and the length of the post-drying phase are limited in time and thereby, limit the approach to a desired ultimate residual moisture of the laundry. The smaller the residual moisture values at the end of the heating phase, the more accurately the value of the ultimate residual moisture can be held.

SUMMARY OF THE INVENTION

It is therefore an object of the invention to make possible the measurement of low residual moisture values so that the start of the post-drying phase without heating can be controlled in direct dependence on reaching this low residual moisture value.

With the foregoing and other objects in view, there is provided in accordance with the invention a circuit for controlling a program switching device of a laundry dryer as a function of the moisture-dependent resistance of the laundry in the dryer, in which spaced sensing electrodes are disposed in the dryer and bridged by the laundry with resistance between the electrodes varying depending on moisture content of the laundry, a pulse generator connected to the electrodes and having at the pulse generator output a pulse train with a duty cycle-frequency depending on the magnitude of the laundry resistance, said pulse generator formed by a storage capacitor charged from a d-c source and a resistor which together with laundry resistance determines the duty cycle-frequency, and a transistor connected as an impedance transformer to an amplifier, a filter member connected to the output of the pulse generator, a comparator having one input connected to the output of the filter member and a second input connected to a reference value setter, and the comparator output connected to activate said program switching device when the laundry is dried to a set moisture content.

Other features which are considered as characteristic for the invention are set forth in the appended claims.

Although the invention is illustrated and described herein as embodied in a circuit for controlling a dryer-program switching device, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing in which diagrammatically is shown a circuit arrangement for controlling a program timer for a laundry dryer having a pulse generator, a filter member, and a comparator with a reference value setter.

DETAILED DESCRIPTION OF THE INVENTION

The circuit arrangement in accordance with the invention has a storage capacitor as part of a member determining the frequency or the duty cycle of an oscillator. A comparator has one input connected to the output of the oscillator, and the other input connected to a reference value setter. The output of the comparator is functionally connected to parts of the program timer of the laundry dryer. Since oscillators with an impedance transformer on the input side can exhibit a very high input impedance, integration of the storage capacitor into the member determining the frequency or the duty cycle means that the changes in the resistance of the laundry lead to an easily observable change of the electrical variable of the connected converter at considerably higher resistance values than in the known methods. In the circuit arrangement according to the invention, this electrical variable consists either of the frequency or the duty cycle of the oscillator output signal. The conversion of the variables of this electrical signal into other correspondingly variable electrical signals which are suitable for comparison with simple, settable reference variables (current, voltage), is immediately familiar to an expert.

In the case of an oscillator output signal, the duty cycle of which depends on the magnitude of the resistance of the laundry, a rectifier and filter member is suitable for conversion into an adequate d-c voltage. The output voltage of this filter member, which varies with the magnitude of the laundry resistance, is fed to a comparator, which compares this voltage with the predetermined reference voltage. The comparator circuit can be designed so that an output signal delivered to parts of the program timer appears, if the compared voltages agree.

The invention will be illustrated in the following with the aid of an embodiment example shown in the drawing.

The drawing shows diagrammatically a circuit arrangement consisting of three subassemblies for controlling a program timer for a laundry dryer comprising a pulse generator 1 employed as an oscillator with variable duty cycle, a filter member 2 operating in the manner of a low-pass filter, and a comparator 3 which compares the output voltage of the filter member with a predetermined reference voltage.

The resistance 10, shown in broken lines, represents the resistance of the laundry between the two sensing electrodes 101 of the laundry dryer. The laundry resistance, together with the capacitors 11 and 12 and the resistor 15, forms a member which determines the duty cycle and/or the frequency of the pulse generator and which is connected via a transistor 13, connected as an impedance transformer, to one input of the amplifier 14. Together with the remaining external circuitry, the amplifier 14 forms a pulse generator, at the output of which a pulse train with a duty cycle and/or frequency depending on the magnitude of the laundry resistance 10 is present. The term duty cycle-frequency as used herein and in the claims denotes that either the duty cycle or the frequency or both depend on the magnitude of the laundry resistance.

This output signal is brought to one input of an amplifier 21 of the filter member 2, the external circuitry of which is represented diagrammatically by a capacitor 22 and a resistor 23. The output signal of the amplifier 21 is proportional to the duty cycle of the output signal of the amplifier 14 and is fed to the input of the amplifier 31 in the comparator 3. Two different reference voltages can be set by means of the resistors 32 and 33 and the switch 34 of reference value setter 5, which voltages are brought to the other input of the amplifier 31. With the switch 34 closed, a voltage can be connected, for instance, which corresponds to a residual moisture value of 25%. With the switch 34 open, the reference voltage set can correspond, for instance, to a residual moisture value of 10%. As soon as the voltages at the two inputs of the amplifier 31 agree, the latter delivers via its output line 35 a signal to the base of a transistor 41 which is part of a program timer and operates, via a relay 42, a break contact 43 in the control circuit R-Mp for the heater of the laundry dryer. The control circuit R-Mp can further be provided with a cam switch 44 of a program timer; the heater can be switched, for instance, via a relay 45.

The invention is not limited to the embodiment example shown. The individual subassemblies 1 to 3 can be constructed, of course, of discrete components such as transistors, resistors, capacitors, or of off-the shelf operational amplifiers and digital components, resistors and capacitors, or of a single cutsom-made integrated circuit. As already mentioned, the filter member 2 can also be replaced by another conversion device if electrical variables other than those described before are to be applied to its input and its output. Furthermore, the type of the reference value setter 32 to 34, shown as an example, is not limited to the example shown. For instance, two resistances of different magnitude can be connected selectively via a double-throw switch to a d-c voltage source, or a correspondingly adapted resistor circuit can be provided, by which different currents can be adjusted as reference values.

There are claimed:

1. Circuit for controlling a program switching device of a laundry dryer as a function of the moisture-dependent resistance of the laundry in the dryer, in which spaced sensing electrodes are disposed in the dryer and bridged by the laundry with resistance between the electrodes varying depending on moisture content of the laundry, a pulse generator connected to the electrodes and having at the pulse generator output a pulse train with a duty cycle-frequency depending on the magnitude of the laundry resistance, said pulse generator formed by a storage capacitor charged from a d-c source and a resistor which together with laundry resistance determines the duty cycle-frequency, and a transistor connected as an impedance transformer to an amplifier, a filter member connected to the output of the pulse generator, a comparator having one input connected to the output of the filter member, and a second input connected to a reference value setter, and the comparator output connected to activate said program switching device when the laundry is dried to a set moisture content.

2. Circuit according to claim 1, wherein the output of the pulse generator is connected to a filter member having an amplifier, capacitor and resistor to produce an output signal proportional to the duty cycle-frequency of the pulse generator output and attenuate other outputs, and the filter member output connected to the first input of the comparator.

* * * * *